US011615245B2

United States Patent
Jain et al.

(10) Patent No.: US 11,615,245 B2
(45) Date of Patent: Mar. 28, 2023

(54) ARTICLE TOPIC ALIGNMENT (71) Applicant: INTERNATIONAL BUSINESS MACHINES CORPORATION, Armonk, NY (US)

(72) Inventors: Sanket Jain, Gurgaon (IN); Mukundan Sundararajan, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 86 days.

(21) Appl. No.: 17/165,436

(22) Filed: Feb. 2, 2021

(65) Prior Publication Data
US 2022/0245345 A1    Aug. 4, 2022

(51) Int. Cl.
G06F 40/289    (2020.01)
G06F 40/131    (2020.01)
G06K 9/62      (2022.01)
G06F 40/166    (2020.01)
G06V 30/413    (2022.01)

(52) U.S. Cl.
CPC .......... G06F 40/289 (2020.01); G06F 40/131 (2020.01); G06F 40/166 (2020.01); G06K 9/6259 (2013.01); G06V 30/413 (2022.01)

(58) Field of Classification Search
CPC .................................................. G06F 40/289
See application file for complete search history.

(56) References Cited

U.S. PATENT DOCUMENTS

| 5,544,049 A * | 8/1996 | Henderson et al. .... G96F 17/30 |
| 8,645,370 B2 | 2/2014 | Yu et al. |
| 2016/0098398 A1* | 4/2016 | Bufe et al. ........ G06F 17/30011 |
| 2019/0278835 A1 | 9/2019 | Cohan et al. |

FOREIGN PATENT DOCUMENTS

CA    2496567    3/2004

OTHER PUBLICATIONS

Mell et al., "The NIST Definition of Cloud Computing", NIST, Special Publication 800-145, Sep. 2011, 7 pages.
Unknown, "Scoring Text Segments in a Document by Intent", IP.com, Jan. 28, 2014, 6 pages.
(Continued)

Primary Examiner — James J Debrow
(74) Attorney, Agent, or Firm — Scott Dobson; Andrew D. Wright; Calderon Safran & Cole, P.C.

(57) ABSTRACT

A method including: analyzing, by a computing device, a plurality of portions of a document; determining, by the computing device and based on the analyzing, a concept of each of the portions of the document; comparing, by the computing device, a title of the document with the concept of each of the portions of the document; determining, by the computing device and based on the comparing, an alignment of the concept of each of the portions of the document with the title; generating, by the computing device and based on the alignment, a propensity score for each of the portions of the document; and reordering, by the computing device and based on the propensity scores, the portions of the document from most aligned with the title to least aligned with the title.

20 Claims, 6 Drawing Sheets (56) References Cited

OTHER PUBLICATIONS

Khatri et al., "Abstractive and Extractive Text Summarization using Document Context Vector and Recurrent Neural Networks", KDD'18 Deep Learning Day, Aug. 2018, 10 pages.
Vinayakumar Kolli, "Method and System for Providing Relevancy and Dominance based Text Summarization", IP.com, Jun. 11, 2015, 7 pages.
Jesus Najera, "Graph Theory—On to Network Theory", https://towardsdatascience.com/graph-theory-on-to-network-theory-379b390fb19b, Nov. 26, 2018, 8 pages.
Dan Williams, "Can graph theory predict the World Cup winner?", https://cambridge-intelligence.com/graph-theory-world-cup-winner-prediction/, Jun. 29, 2018, 9 pages.

\* cited by examiner

ARTICLE TOPIC ALIGNMENT

BACKGROUND

Aspects of the present invention relate generally to document improvement and, more particularly, to determining an alignment of content of a document with the title of the document.

Many documents such as, for example, magazine or newspaper articles, have titles or headlines that purport to describe the subject of the document. These titles attempt, in varying degrees, to educate the reader as to the content of the document.

SUMMARY

In a first aspect of the invention, there is a computer-implemented method including: analyzing, by a computing device, a plurality of portions of a document; determining, by the computing device and based on the analyzing, a concept of each of the portions of the document; comparing, by the computing device, a title of the document with the concept of each of the portions of the document; determining, by the computing device and based on the comparing, an alignment of the concept of each of the portions of the document with the title; generating, by the computing device and based on the alignment, a propensity score for each of the portions of the document; and reordering, by the computing device and based on the propensity scores, the portions of the document from most aligned with the title to least aligned with the title.

In another aspect of the invention, there is a computer program product including one or more computer readable storage media having program instructions collectively stored on the one or more computer readable storage media. The program instructions are executable to: analyze a plurality of portions of a document; determine, based on the analyzing, a concept of each of the portions of the document; compare a title of the document with the concept of each of the portions of the document; determine, based on the comparing, an alignment of the concept of each of the portions of the document with the title; generate, based on the alignment, a propensity score for each of the portions of the document; and generate, based on the concept of each of the portions of the document, a caption for each of the portions of the document.

In another aspect of the invention, there is system including a processor, a computer readable memory, one or more computer readable storage media, and program instructions collectively stored on the one or more computer readable storage media. The program instructions are executable to: analyze a plurality of portions of a document; determine, based on the analyzing, a concept of each of the portions of the document; compare a title of the document with the concept of each of the portions of the document; determine, based on the comparing, an alignment of the concept of each of the portions of the document with the title; generate, based on the alignment, a propensity score for each of the portions of the document; and reorder, based on the propensity scores, the portions of the document from most aligned with the title to least aligned with the title.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to document improvement and, more particularly, to determining an alignment of content of a document with the title of the document. In this disclosure, the term "alignment" refers to a level of similarity or correlation between two elements of a document. For example, alignment of content of a document with the title of the document refers to a quantifiable extent to which the title properly represents the content of the document. According to aspects of the invention a document such as an article is analyzed to determine how well sections of the document align with the title of the document. In embodiments, paragraphs and photographs in an article are analyzed and captions are generated for each paragraph and each photograph. In embodiments, a networked graph pictorially summarizes the entities, relationships and weights amongst the paragraphs and pictures in relation to the title. In this manner, implementations of the invention improve the experience of a reader of the document by allowing the reader to quickly determine their level of interest in the document and to move quickly to sections of their interest. Embodiments are directed at multiple types of people. For instance, those who like to read text and those who like to look at photographs. For B2B (business to business) domain or enterprises, embodiments find an article (that includes information about deals, mergers and acquisitions, for example), and then plot a graph of the entities, relationships and weighted attributes which are similar to a summary of that article. Embodiments use a plurality of such articles to provide graphs and good information about B2B. Such graphs and information can be helpful to B2B as it is often difficult to find good quality and relevant rich data. In embodiments, NLU or Natural Language Understanding is applied to find the length of relationship between firms. A lot of factual information can make it easier for the graph to automatically find the vertices (nodes) and the edges—about the central topic—from reading that paragraph.

In embodiments, a method includes a step wherein, based on one or more concepts in paragraphs of text in a document (such as, for example, an article) and pictures in the document, the title or headline of the document is analyzed to determine an alignment of the one or more concepts with the title or headline. In embodiments, multi-lingual analysis of words in the paragraph is performed to determine if any of the words or phrases have a high risk meaning in other languages, and those words are flagged. Non-exclusive examples or high risk meanings are sensitive subject matter, controversial subject matter, meandering content, or other undesirable content. In embodiments, a method includes a step of learning from a user their areas of interest and using that learning to interpret different acronyms or Named Entity Recognition (NER) to provide relevant information.

Embodiments include ascertaining an intent of the document and condensing the document by removing paragraphs, sections, and/or photos that are not aligned with the intent of the document. Embodiments include generating a pertinent summary of the document. Embodiments include determining whether a section of the document is aligned with the title of the document by labelling the sections and photographs of the document and determining the number of relevant sections and photographs based on a deep learning seq2seq model. Embodiments include assigning a propensity score (for example, 0 to 1) to all the sections and the photos in terms of their alignment to the topic under discussion. Embodiments include captioning photos and paragraphs by identifying patterns in photos using convolution neural networks (CNN) and using an attention mechanism to identify individual parts of the photo which are most important in relation to the particular paragraphs. Embodiments include predicting an intent of the document by deriving attributes and assigning weights to those attributes using deep learning. Embodiments include leveraging graph theory to depict each paragraph and each photograph as a node, depicting association between the paragraphs and photographs as edges, and depicting the properties between those nodes as (weighted) attributes across n-gram words, phrases and contexts. Embodiments include applying unsupervised learning through clustering (such as, for example, k-Means, gap statistic, elbow method, etc.) to determine which paragraphs (and photographs) should be grouped together to provide improved and efficient search results with relevance to a search string. As an example, the search keyword or term "baja rain" will be discussed. In this example, there exists a product, called "Baja Rain" and there exists a region called "Baja" where it may occasionally rain. For that term, it would be beneficial to find twenty (20) instances of that particular thing (i.e., topic) in the article rather than 20 instances of the name of "Baja". Today's NLP or natural language processing can provide context beyond keywords; however, it still returns a lot of pages that are not relevant to the search topic. This can the user to re-enter her search phrase. Embodiments crawl through a particular article, with edges as phrase, which would be synonymous with not being searched or indicative of what is being searched for, thus being multi-dimensional in nature.

Implementations of the invention are improvements to the functioning of a computer. For example, reordering, based on propensity scores, portions of a document from most aligned with the title of the document to least aligned with the title of the document improves the accuracy and efficiency of a computer when modifying an article to improve readability of the article. In addition, implementations of the invention are improvements to the technical field of computer-based article presentation. For example, determining an alignment of paragraphs and photographs in an article with the title of the article and manipulating the paragraphs and photographs based on the alignment improves the accuracy and efficiency of browsing and reading electronic articles. As an example, embodiments of the invention apply deep learning's seq2seq model by labeling each section and photograph in the article, counting the number of sections and photographs, finding whether a section or photograph is aligned with the title, and assigning a propensity score (0 to 1) to all the sections and the photographs based on their alignment with the topic under discussion. Embodiments sort the sections and photographs based on their propensity score. Embodiments implement convolutional neural networks to identify patterns in the photographs. Embodiments derive attributes of the sections and/or photographs to better predict the intent of the article, after which deep learning is used to assign weights to those derived attributes. Embodiments apply unsupervised learning through clustering (for example, k-Means clustering) to determine paragraphs and/or photographs to group together. In embodiments, the groupings are then used to recommend to the reader the traits of each paragraph and/or photograph so that the reader can choose to continue to read a particular article or stop without reading the paragraph that may not be of interest to the reader. The above features improve the quality of presentation of an article to a reader in that the reader can more quickly and accurately determine the content of the article due to application of one or more of the above features. In this manner, embodiments improve the technical field of computer-based article presentation. In addition, implementations of the invention include features that are not well understood, routine, or conventional activity in the relevant art. For example, analyzing a plurality of portions of a document; determining, based on the analyzing, a concept of each of the portions of the document; comparing a title of the document with the concept of each of the portions of the document; determining, based on the comparing, an alignment of the concept of each of the portions of the document with the title; generating, based on the alignment, a propensity score for each of the portions of the document; and generating, based on the concept of each of the portions of the document, a caption for each of the portions of the document is not well-understood, routine, or conventional.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In some cases, there is a bias in the way reports and news are being published in newspapers and other media. For example, the headline or title of an articles can carry some degree of negative connotation in an attempt to draw attention of the reader to the article. This is sometimes the case even when the article is directed to a subject more positive than the title suggests. To counter this, embodiments develop a summary of the article and place it beneath the main title of the article. In this way, the reader can look see a title or summary that more accurately represents the content of the article.

In some situations, a photograph prompts a reader to think in a particular manner. As a result, embodiments determine if a photograph promotes thinking that is in accordance with the content of the article, as opposed to promoting thinking that is less in line with the content of the article but is considered by the author more likely to provoke one who views the photograph to read the article, or at least "click" on the article. As a result, embodiments calculate the percentage alignment of the title of the article to the concept of the article, and that of each paragraph (or photograph) with the concept of the article with such metric being used during searching for articles to return only those articles satisfying the percentage alignment measure specified along with the search string. Embodiments find articles and modify them for a user. Embodiments create a metric called percentage alignment for each article which indicates how much of the content has been indicated in a topic heading or sub-heading, and then within a section of the article. If the article is a technical article, it can be easier to do so because embodiments decipher that the content is talking about a certain logic say X1, even if the article discusses X1 for a mere one or two sentences in that particular paragraph. This can help embodiments find the percentage alignment of that sentence, which in this case should be low for that article. Embodiments generate a conclusion by the author, which can be abstract in its nature. The author takes a view, then provides a balanced view (headlines mention X1 but sub-headings mention Y1).

Embodiments of the invention include analyzing portions, such as, for example, paragraphs and/or photographs, of a document in relation to a title of the document to determine how well the title aligns with the content of the portions of the document. The term "article" is used herein to represent a non-limiting example of a document and should not be interpreted to limit embodiments of the invention to just articles. In embodiments, titles that include words that have multiple meanings and/or words that are similar to other words that have different meanings are flagged as being risky. In embodiments, the term "risky" means that there is a risk that the title could relay to a reader a meaning different from the intent or content of the document. A higher risk means that a title has a higher likelihood of relaying a meaning different from the intent or content of the document. In embodiments, words in the title are analyzed to determine if the title includes one or more words that have meaning in languages other than the language in which the document is presented.

Embodiments consider areas of interest of the reader in determining possible meanings of acronyms or other terms in the title. Embodiments use Named Entity Recognition (NER) to provide relevant information related to the meaning of terms in the title.

Titles such as "Data Science is Different Now" can have a much higher probability of being clicked and subsequently being read than titles such as "Data Science vs. Data Engineering". Embodiments ascertain the intent of the article and condense the article by removing paragraphs, sections or photographs that are not aligned with the intent of the article. Embodiments determine an alignment (such as, for example, high, medium, or low) and/or an affinity score of the title, each paragraph, each section, and each photograph relative to the intent of the article.

There is a growing volume of content available electronically, such as on the Internet, and it is becoming increasingly difficult for a consumer to consume such content due to this volume. For articles that are, for example, technical such as data science blogs, and that require more than, for example, ten minutes reading, embodiments produce a pertinent summary. In embodiments, the summary is in plain English and/or business or other terms that are easily understood. In embodiments, the summary comprises two lines at the top of the article and two lines at the bottom of the article. Such summaries increase manifold the number of readers engaged by the article and, as a result, the likelihood of the article being upvoted ("liked", etc.).

The following meanings are provided for terms used in this disclosure: the term undirected graph is understood to mean a graph that does not have a particular direction for edges; the term directed graph is understood to mean a graph in which edges have a particular direction; the term connected graph is understood to mean a graph where there is no unreachable vertex (there is a path between every pair of vertices); the term disconnected graph is understood to mean a graph where there are unreachable vertices (there is not a path between every pair of vertices); the term finite graph is understood to mean a graph with a finite number of nodes and edges; and the term infinite graph is understood to mean a graph where an end of the graph in a particular direction extends to infinity.

Embodiments find and analyze articles that have a title that summarizes a topic of the article in, for example, only up to five words and produce a percentage alignment of each paragraph and each photograph in the article with the title of the article. For an article written by a journalist, and which contains a title with only, for example, five words, it can be difficult to predict the intent of the article due to the elements of creativity, subconscious bias, etc., that influence the title.

Embodiments augment the information relayed by and/or the impact of a title by, for example, adding words that invoke thoughts of other topics and/or products. For example, embodiments change the title "Beneath the Wave" to "Beneath the New Wave" and show merchandise and a photograph of a new wave musical band. In this way, embodiments increase sales of music merchandise. Embodiments show a short piece of trivia on the side of the article containing information related to the title. Embodiments adds words to the title based on characteristics of a particular reader or group of readers such as, for example: articles that the reader has read; the day of the week (more time available for reading at leisure during a weekend); time of the day; whether the reader is detail oriented; technical nature of the reader; occupation of the reader, etc. Today, titles of articles have become creative and (somewhat) contextual in how they make use of the English language. For instance, "Penlighten"—an evolution of the word "enlighten"—can be used to depict the power of a pen in enlightening an idea.

Embodiments apply deep learning's seq2seq model by labeling each section and photograph in the article, counting the number of sections and photographs, finding whether a section or photograph is aligned with the title, and assigning a propensity score (0 to 1) to all the sections and the photographs based on their alignment with the topic under discussion. If only a portion of the article is made available, embodiments assign the propensity score between 0 and 1 to those sections and photographs which are made available. Embodiments sort the sections and photographs based on their propensity score.

Embodiments generate a caption for each section (such as, for example, a paragraph) and each of the photographs. Embodiments implement convolutional neural networks (CNN) to identify patterns in the photographs. Embodiments derive attributes of the sections and/or photographs to better predict the intent of the article, after which deep learning is used to assign weights to those derived attributes. Examples of derived attributes include: brightness of the photograph; the presence of a human being in the photograph; multiple photographs containing images of one species (e.g., dogs) indicating that the article could be about that particular species (e.g., dogs); size of the photograph; ratio of the size of the photograph to the size of the article; whether all the photographs have captions; whether none of the photographs have a caption; whether the article ends with a question or a supposition; number of authors and co-authors of that article or blog; whether the blog or article contains some relevant characters; whether the article impacts human life directly (such as the importance of eating or drinking the right food, etc.; the purpose of the author who is reading the blog; how to effectively weight features; how to combine these features with textual evidences for popularity prediction of the article; and percentage of useful contribution made by a section of the article. Percentage of useful contribution made by a section can become a weighted attribute on the edge of the graph, where the node would be an article and another node would be a section. Embodiments use Reinforcement Learning to produce percentage alignment of each section and each photograph in an article with the topic of that article.

Other examples of derived attributes include: alignment of the photo with the abstract or the introduction of the article, parent child hierarchy formation; corrections made by the author in the comments section, especially after a viewer spots that error; assignment of weights to certain authors or types of articles. For example, use of artificial intelligence (AI) to save human lives in a medical field might have a much bigger and immediate impact than the use of AI to detect a cat versus a dog. Embodiments then focus on the type of article to which the maximum weight has been assigned. To generate the captions, embodiments use an attention mechanism to grasp individual parts of the images in the photographs which are most important at that particular instance. Embodiments rank a number of top recommendations for a caption and then request an operator of the system to choose from among the top recommendations.

Embodiments assign a weighted score to each paragraph based on the relevance or contribution of the paragraph to the overall article, which can be measured by the number of pieces of positive feedback such as, for example, reposting or "likes" of the main entities involved in that paragraph. Embodiments leverage graph theory to depict each paragraph and each photograph as a node, associations between the nodes as edges, and properties between the nodes as (weighted) attributes. In embodiments, each node is represented as an element in a matrix, the alignment among those nodes can be considered a vector, and the alignment of each node with the overall topic can be another vector. In this manner, five or ten nodes, for example, can capture or represent the content of the entire article.

Embodiments apply unsupervised learning through clustering (from among k-Means, gap statistic, elbow method, etc.) to determine paragraphs and/or photographs to group together. In embodiments, the groupings are then used to recommend to the reader the traits of each paragraph and/or photograph so that the reader can choose to continue to read a particular article or stop without reading the paragraph that may not be of interest to the reader. Summarizing an article can be complicated because different a user may be looking at the article from multiple viewpoints, or the author may want to bring out multiple viewpoints. In light of this, embodiments apply analytics such as, for example, unsupervised learning methods to find multiple intents of the article, and to rank those intents.

Embodiments apply the above features and methods to, for example: determine the popularity or prestige of the author; predict the type of the article (such as it is a recipe to solve a certain problem); predict the domain of the article; find the level of mathematical and academic detail and rigor in the article; find the level of technical detail in the article; and predict the reason of the author for writing the article on a platform at a particular time of the year. To determine the efficacy of the applied features and methods, embodiments consider key performance indicators (KPIs) such as, for example, the time gap between the author's articles, the time span required to read each article of the author, the number of views of the article, the number of distinct users who viewed the article, and the number of shares and/or likes of the article. Embodiments use other KPIs such as, for example, whether the topic ends with a question mark, and whether the topic contains two diametrically opposite views, etc.

Embodiments make recommendations to the author to correct grammatical (or logical) errors in the title or other parts to the article. Embodiments determine whether the photograph (if there is only one photograph used in the article) captures or encapsulates the intent of the entire article. If it does not, then embodiments determine what percentage of the intent of the article can be captured by the one photograph. Embodiments determine, if there is more than one photograph in the article, whether the last and final photograph (or any one photograph) sufficiently captures the intent of the entire article.

Embodiments prepare a picture that summarizes the intent of the entire article, as well as provides a recommendation. For example, if there is a high amount of pollution in a particular city, then embodiments select a photograph that suggests ways to reduce the pollution, the extent of the problem (such as 40% reduced capacity of lungs), and the number of people and particular groups of people that are most affected.

Embodiments complete the caption or title of a picture in a blog. For example, a picture of a car on a highway means, in the context of the article, that a person is on the road to success. Embodiments use graph theory to complete the caption or title in this manner. Embodiments use graph theory to deduce the contents of the article by looking at just its topic and/or the first few lines of the article.

Embodiments extract or decipher the intent of the author and predict whether there is a gap between the intent of the author and what appears to be the intent based on the author's final summary or conclusion. Embodiments use reinforcement learning to assign a reward that identifies a maximum gap between intent and outcome. Embodiments observe sample trajectories performed by the agent in the environment and use them to predict the policy, given a particular state configuration. Embodiments use inverse reinforcement learning to find the reward function from sample trajectories and use the reward function to frame the desirable actions. Embodiments shorten the final summary of an article into just one sentence. Embodiments prepare the most relevant summary according to the taste of the user.

Embodiments consider each paragraph of an article as a document, prepare summaries of photographs and/or paragraphs using extractive methods where the words used to summarize the photograph or the paragraph come from the document, provide each photograph and paragraph with a caption, and classify the document as high risk, medium risk, low risk, or other. Embodiments flag as high risk a detrimental word in the title when the article is not related to that word. Embodiments use named entity recognition to tag such words.

Embodiments design a survey and ask users to provide their preference of the topics that they would be most interested in, and then ask them to rank the top three subjects. Embodiments apply unsupervised learning to automatically judge the content that the user would most like to read and then choses a meaning of an acronym that relates to the user's likes. For example, if the title includes the acronym "SL" (which has multiple meanings) and the user is interested in sports, embodiments may interpret "SL" to be the professional sports team Springfield Lancers or some other such name. As described in detail below, embodiments prepare a corpus of annotations and rules that are used to create summaries and other modifications described herein. Embodiments store an initial probabilistic scenario and its solution in the corpus and then later apply the solution to future occurrences of the problematic scenario. Embodiments build a dictionary of named entities phrases and use the dictionary to auto-correct logical errors in the article.

Embodiments use LSTM RNN (Long Short Term Memory Recurrent Neural Networks) as well as CNN (Convolutional Neural Networks) to incorporate context to classify a document as high risk, medium risk, or some other risk level. Embodiments apply deep learning's seq2seq model and supplement it with RNN (Recurrent Neural Networks) for text summarization. Embodiments determine which photograph in an article is most aligned with the topic of the article and move that photograph to a position in the article before all other photographs. Embodiments apply a Hinge Loss layer or SVM (Support Vector Machines) layer below the CNN layer to make the model end-to-end trainable (hinge loss is differentiable; the loss can be backpropagated through the CNN stack and trained end-to-end.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
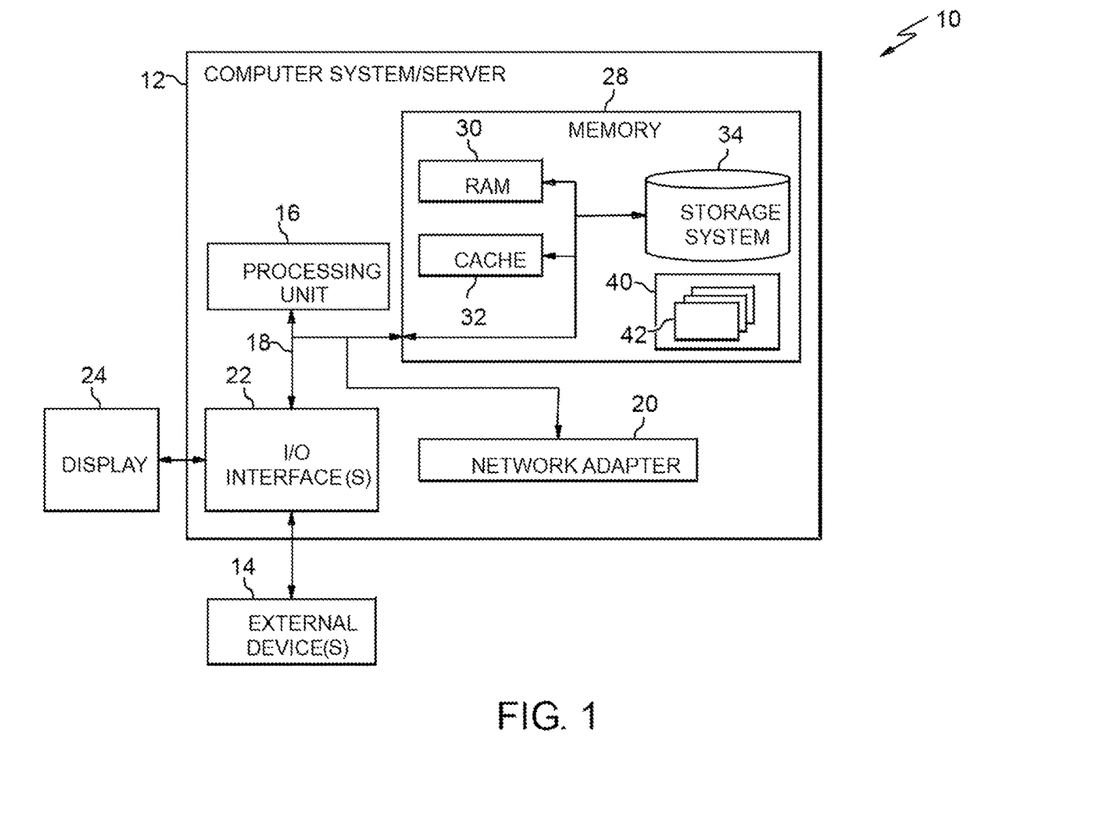
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
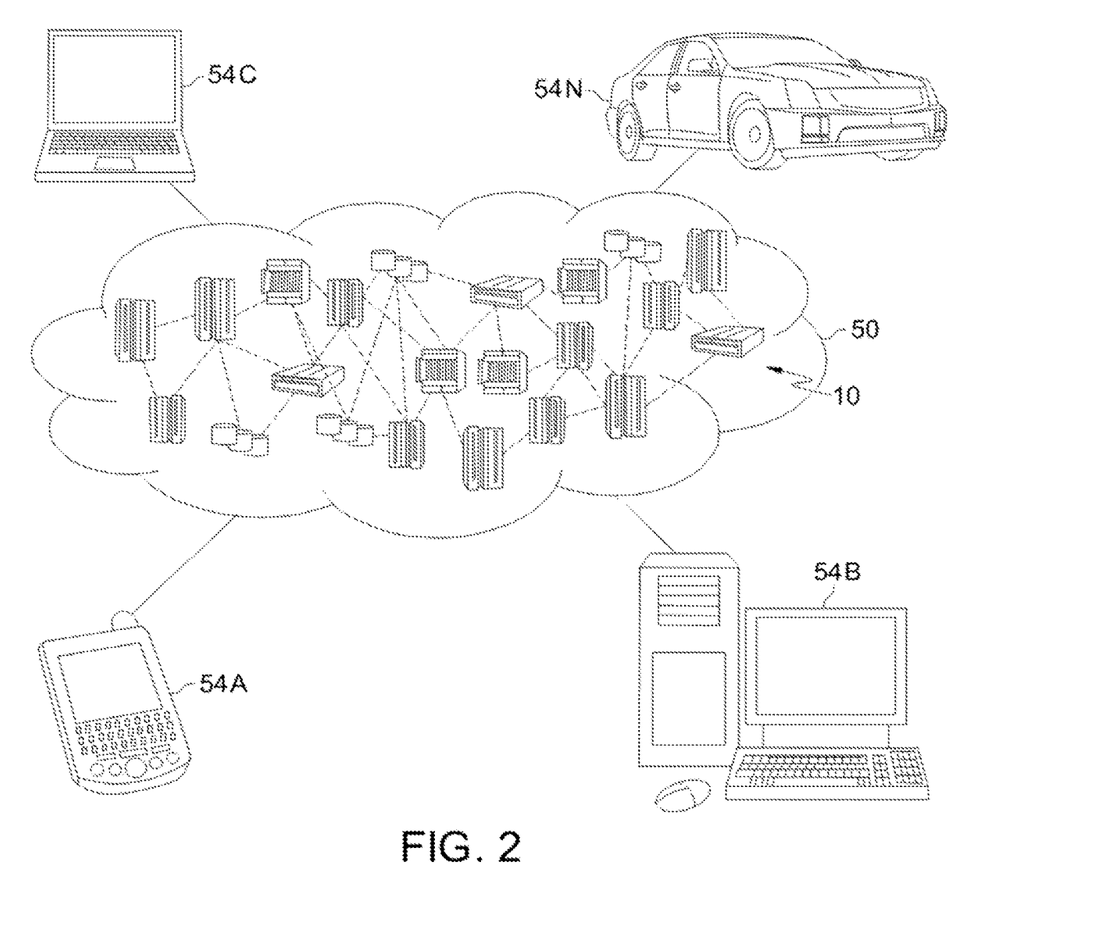
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
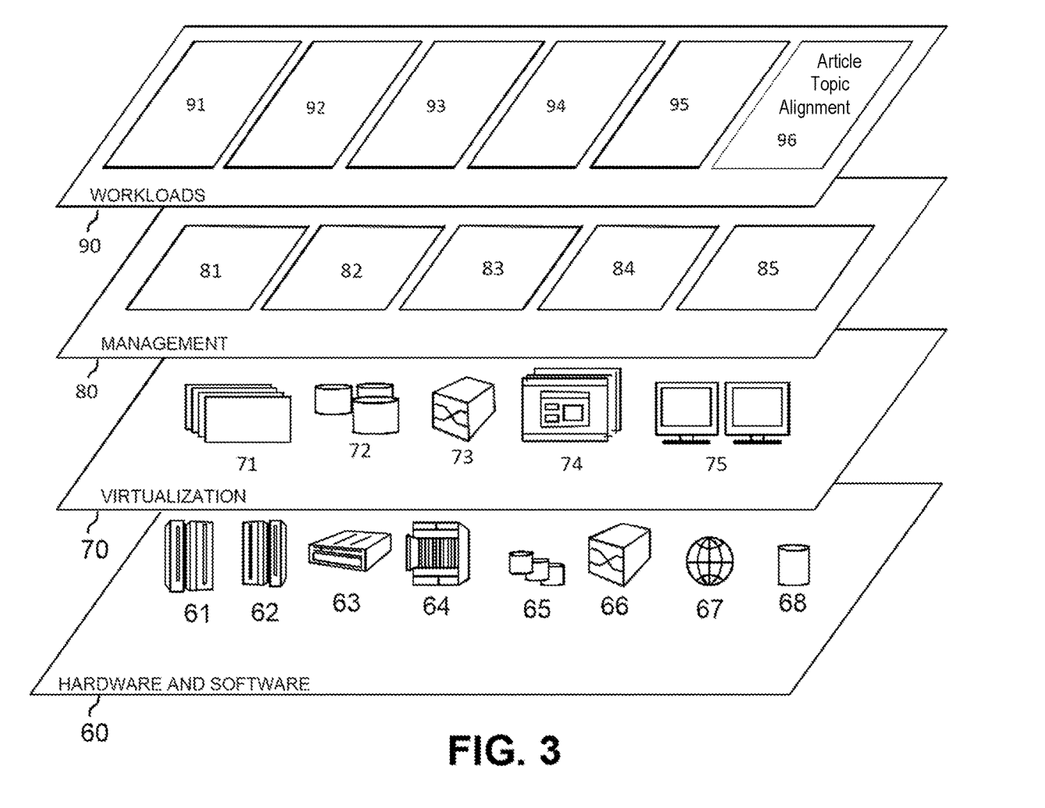
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and article topic alignment 96.

Implementations of the invention may include a computer system/server 12 of FIG. 1 in which one or more of the program modules 42 are configured to perform (or cause the computer system/server 12 to perform) one of more functions of the article topic alignment 96 of FIG. 3. For example, the one or more of the program modules 42 may be configured to: analyze a plurality of portions of a document; determine, based on the analyzing, a concept of each of the portions of the document; compare a title of the document with the concept of each of the portions of the document; determine, based on the comparing, an alignment of the concept of each of the portions of the document with the title; generate, based on the alignment, a propensity score for each of the portions of the document; and reorder, based on the propensity scores, the portions of the document from most aligned with the title to least aligned with the title.

Figure 4:
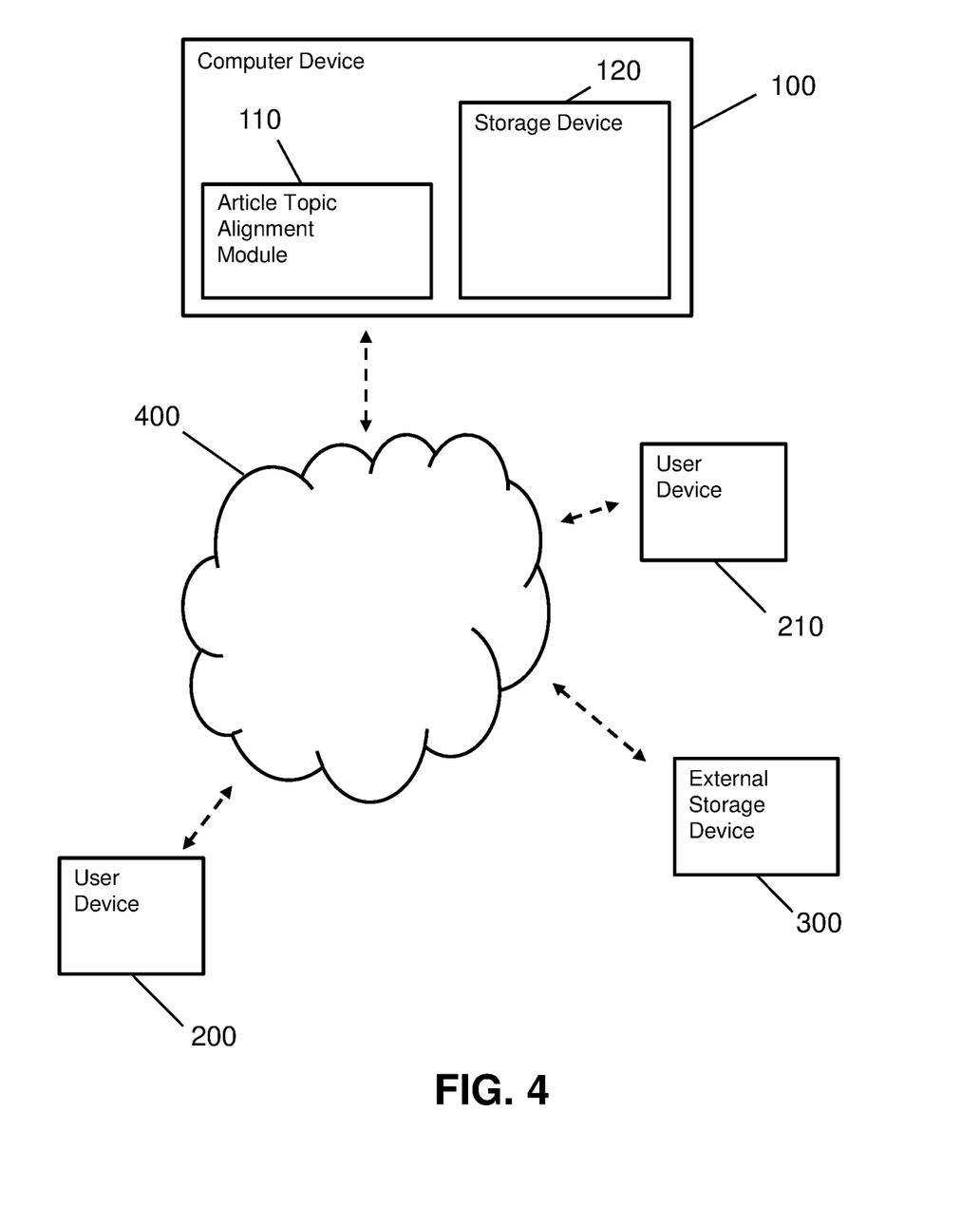
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 400 such as, for example, cloud computing environment 50. In this example, computer device 100 includes an article topic alignment module 110, for example, one or more of program modules 42 in FIG. 1, and a storage device 120 such as, for example, storage system 34 in FIG. 1.

FIG. 4 shows an external storage device 300 such as, for example, another computer device having some or all of the features of computer system/server 12 in FIG. 1, that is external to computer device 100 and contains a corpus of articles and documents that is accessed by article topic alignment module 110 (other examples include more than one external storage device 300). In embodiments, one or more databases that are accessed by article topic alignment module 110 are stored on storage device 120.

FIG. 4 shows a user device 200 such as, for example, another computer device having some or all of the features of computer system/server 12 in FIG. 1, that provides a user interface for a user to interact with article topic alignment module 110 as described with reference to FIG. 5, below. In embodiments, user device 200 is a desktop computer. FIG. 4 shows a user device 210 such as, for example, another computer device having some or all of the features of computer system/server 12 in FIG. 1, that provides a user interface for a user to view over network 400 articles, blogs, and other sources of information that have been processed by article topic alignment module 110. In embodiments, user device 200 is a laptop computer or tablet.

In embodiments, computer device 100 comprises article topic alignment module 110, which may comprise one or more program modules such as program modules 42 described with respect to FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Figure 5:
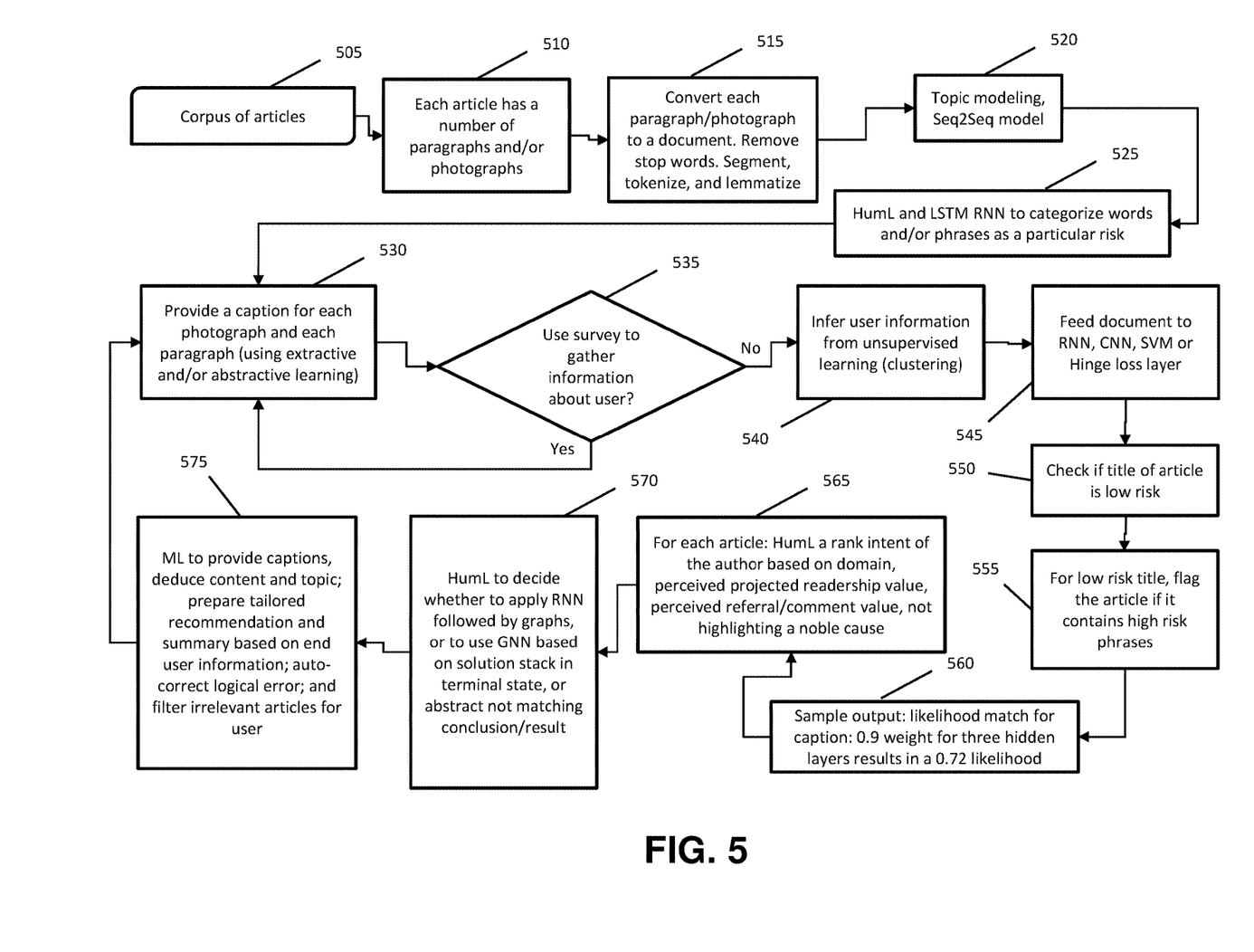
FIG. 5 shows a block diagram of an exemplary method in accordance with aspects of the invention.

FIG. 5 shows a block diagram/flowchart of an exemplary method in accordance with aspects of the present invention. Steps of the method may be carried out on a system in the environment of FIG. 4 and are described with reference to elements depicted in FIG. 4. The system creates and uses a corpus of documents that forms a knowledge base for the system.

At step 505, the system assembles and stores a corpus of articles and/or other documents that are searchable by a user of the system. For simplicity, the term "article" will be used to represent articles and other documents in the corpus. In embodiments, and as described with respect to FIG. 4, article topic alignment module 110 assembles a plurality of documents such as news articles and other articles.

At step 510, the system parses each article into one or more paragraphs and/or photographs. In embodiments, and as described with respect to FIG. 4, article topic alignment module 110 analyzes each article in the corpus and separates each article into a number of paragraphs and photographs.

At step 515, the system converts each paragraph and photograph to a document and then processes the paragraphs with natural language processing (NLP). In embodiments, the NLP includes removing stop words (commonly used words that are not useful in determining the content of a document), segmentation (dividing each paragraph into words, sentences and/or topics), tokenization (splitting phrases, sentences and paragraphs into smaller units such as words and terms) and lemmatization (grouping together inflected forms of a word). In embodiments, and as described with respect to FIG. 4, article topic alignment module 110 converts each paragraph and each photograph of each article into a separate document and then performs the above NLP, or other NLP on each document.

At step 520, the system performs topic modeling such as, for example, seq2seq (sequence to sequence) approaches to determine one or more topics for each document. In embodiments, and as described with respect to FIG. 4, article topic alignment module 110 determines one or more topics for each paragraph by performing seq2seq processing on each paragraph.

At step 525, the system categorizes words and/or phrases produced in step 515 as being a particular risk. In embodiments, and as described with respect to FIG. 4, article topic alignment module 110 categorizes each of the words and/or phrases produced in step 515 as having either a low risk or a high risk of being an irrelevant word or phrase for determining a caption for each paragraph. Embodiments include human interaction (human in the loop, HumL)

and/or employ long short term memory (LSTM) and recurrent neural network (RNN) to perform the categorization.

At step 530, the system provides a caption for each photograph and each paragraph. In embodiments, and as described with respect to FIG. 4, article topic alignment module 110 provides a caption for each photograph and each paragraph using extractive and/or abstractive learning. In embodiments, extractive learning includes gaining information regarding a topic directly form a word or phrase. In embodiments, abstractive learning includes gaining information regarding a topic by considering the context, timing, and other information pertinent to a word or phrase.

At step 535, the system determines if a survey should be used to gather information about a particular user. If a survey is used, the survey gathers information about a particular user. In embodiments, and as described with respect to FIG. 4, article topic alignment module 110 conducts a survey (or instructs another module or device to conduct a survey) of a user of the system to gain additional information that is relevant to the particular user and then processing returns to step 530 to refine the captions based on the additional information obtained by the survey. In embodiments, the additional information includes interest level in certain topics, languages spoken by the user, number of articles the user reads in a given period of time, and other user specific information. If a survey is not used, processing proceeds to step 540.

At step 540, the system infers user information from unsupervised learning. In embodiments, and as described with respect to FIG. 4, article topic alignment module 110 infers additional user information using computer implemented unsupervised learning (UL), e.g., a type of machine learning that looks for previously undetected patterns in a data set with no pre-existing labels.

At step 545, the system feeds each document to a Hinge Loss layer or SVM (Support Vector Machines) layer after the CNN layer to make the model end-to-end trainable (hinge loss is differentiable; the loss can be backpropagated through the CNN stack and trained end-to-end. In embodiments, and as described with respect to FIG. 4, article topic alignment module 110 performs this function.

At step 550, the system checks the title of the article to determine if the title is a low risk. In embodiments, and as described with respect to FIG. 4, article topic alignment module 110 checks the title of the article to determine if the title is a low risk.

At step 555, for a low risk title, the system flags the article if it contains one or more high risk phrases. In embodiments, and as described with respect to FIG. 4, article topic alignment module 110 flags articles that have low risk titles and contain one or more high risk phrases to alert the reader that the article may not be directed to the topic that the reader suspects based on the title.

At step 560, the system determines a likelihood of the caption matching the topic of the document. In embodiments, and as described with respect to FIG. 4, article topic alignment module 110 determines a likelihood of the caption matching the topic of the paragraph. For example, if each of the three layers in step 545 has a 90 percent chance of producing a matching caption, the overall likelihood of a matching caption is 72 percent (e.g., $0.90^3$).

At step 565, the system uses HumL (human interaction) to a rank the intent of the author based on domain, perceived projected readership value, perceived referral/comment value, and/or not highlighting a noble cause. In embodiments, and as described with respect to FIG. 4, article topic alignment module 110 uses HumL to a rank the intent of the author based on domain, perceived projected readership value, perceived referral/comment value, and/or not highlighting a noble cause.

At step 570, the system (using HumL or by the system itself) decides whether to apply RNN followed by graphs, or to use a graph neural network (GNN) based on solution stack in terminal state, or an abstract not matching conclusion/result. In embodiments, and as described with respect to FIG. 4, article topic alignment module 110 uses HumL to decide whether to apply RNN followed by graphs, or to use a graph neural network (GNN) based on solution stack in terminal state, or an abstract not matching conclusion/result.

At step 575, the system uses machine learning to: provide captions, deduce content and topic; prepare tailored recommendation and summary based on end user information; auto-correct logical error; and filter irrelevant articles for the user. In embodiments, and as described with respect to FIG. 4, article topic alignment module 110 uses machine learning to provide captions, deduce content and topic; prepare tailored recommendation and summary based on end user information; auto-correct logical error; and filter irrelevant articles for the user.

Figure 6:
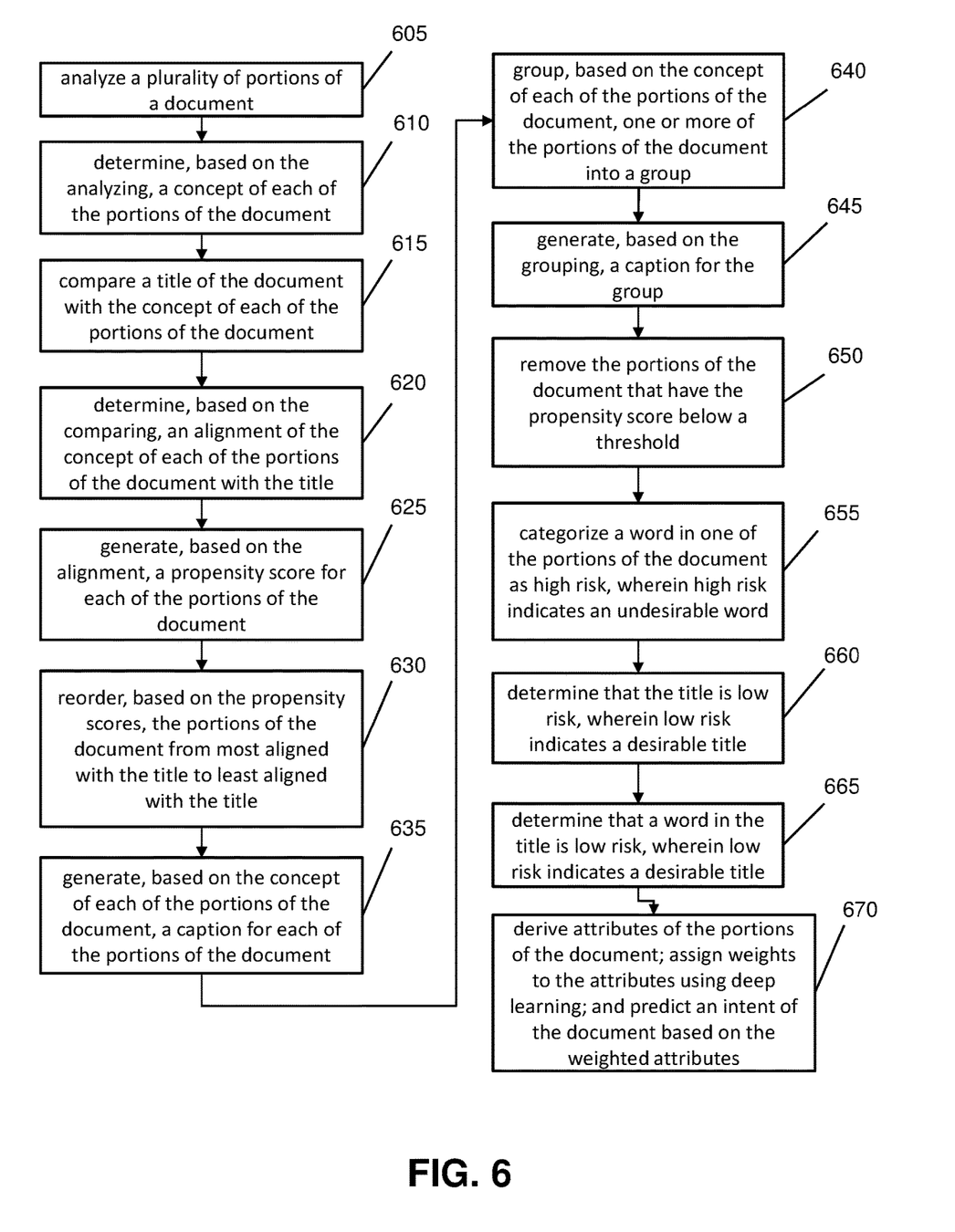
FIG. 6 shows a flowchart of an exemplary method in accordance with aspects of the invention.

FIG. 6 shows a flowchart of an exemplary method in accordance with aspects of the present invention. Steps of the method may be carried out on a system in the environment of FIG. 4 and are described with reference to elements depicted in FIG. 4.

At step 605, the system analyzes a plurality of portions of a document. In embodiments, and as described with respect to FIGS. 4 and 5, article topic alignment module 110 analyzes a plurality of paragraphs and photographs of an article to be viewed by a user on user device 210.

At step 610, the system determines, based on the analyzing, a concept of each of the portions of the document. In embodiments, and as described with respect to FIGS. 4 and 5, article topic alignment module 110 determines, based on the analyzing in step 605, a concept of each of a plurality of paragraphs and photographs of the article to be viewed by a user on user device 210.

At step 615, the system compares a title of the document with the concept of each of the portions of the document. In embodiments, and as described with respect to FIGS. 4 and 5, article topic alignment module 110 compares a title of the article with the concept of each of the paragraphs and photographs of the article determined in step 610.

At step 620, the system determines, based on the comparing, an alignment of the concept of each of the portions of the document with the title. In embodiments, and as described with respect to FIGS. 4 and 5, article topic alignment module 110 determines, based on the comparing in step 615, an alignment of the concept of each of the paragraphs and photographs of the article with the title of the article.

At step 625, the system generates, based on the alignment, a propensity score for each of the portions of the document. In embodiments, and as described with respect to FIGS. 4 and 5, article topic alignment module 110 generates, based on the alignment determined in step 620, a propensity score for each of the paragraphs and photographs of the article.

At step 630, the system reorders, based on the propensity scores, the portions of the document from most aligned with the title to least aligned with the title. In embodiments, and as described with respect to FIGS. 4 and 5, article topic alignment module 110 reorders, based on the propensity scores generated in step 625, the paragraphs and photographs of the article from most aligned with the title of the article to least aligned with the title of the article.

At step 635, the system generates, based on the concept of each of the portions of the document, a caption for each of the portions of the document. In embodiments, and as described with respect to FIGS. 4 and 5, article topic alignment module 110 generates, based on the concept of each of the paragraphs and photographs of the article, a caption for each of the paragraphs and photographs of the article.

At step 640, the system groups, based on the concept of each of the portions of the document, one or more of the portions of the document into a group. In embodiments, and as described with respect to FIGS. 4 and 5, article topic alignment module 110 groups, based on the concept of each of the paragraphs and photographs of the article, one or more of the paragraphs and photographs of the article into a group of paragraphs and photographs.

At step 645, the system generates, based on the grouping, a caption for the group. In embodiments, and as described with respect to FIGS. 4 and 5, article topic alignment module 110 generates, based on the grouping in step 640, a caption for the group of paragraphs and photographs.

At step 650, the system removes the portions of the document that have the propensity score below a threshold. In embodiments, and as described with respect to FIGS. 4 and 5, article topic alignment module 110 removes the paragraphs and photographs of the article that have the propensity score below a threshold.

At step 655, the system categorizes a word in one of the portions of the document as high risk, wherein high risk indicates an undesirable word. In embodiments, and as described with respect to FIGS. 4 and 5, article topic alignment module 110 categorize a word in one of the paragraphs and photographs of the article as high risk, wherein high risk indicates an undesirable word.

At step 660, the system determines that the title is low risk, wherein low risk indicates a desirable title. In embodiments, and as described with respect to FIGS. 4 and 5, article topic alignment module 110 determines that the title is low risk, wherein low risk indicates a desirable title.

At step 665, the system determines that a word in the title is low risk, wherein low risk indicates a desirable title. In embodiments, and as described with respect to FIGS. 4 and 5, article topic alignment module 110 determines that a word in the title of the article is low risk, wherein low risk indicates a desirable title of the article.

At step 670, the system derives attributes of the portions of the document; assigns weights to the attributes using deep learning; and predicts an intent of the article based on the weighted attributes. In embodiments, and as described with respect to FIGS. 4 and 5, article topic alignment module 110 derives attributes of the paragraphs and photographs of the article; assigns weights to the attributes using deep learning; and predicts an intent of the article based on the weighted attributes.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    analyzing, by a computing device, a plurality of portions of a document;
    determining, by the computing device and based on the analyzing, a concept of each of the portions of the document;
    comparing, by the computing device, a title of the document with the concept of each of the portions of the document;
    determining, by the computing device and based on the comparing, an alignment of the concept of each of the portions of the document with the title;
    generating, by the computing device and based on the alignment, a propensity score for each of the portions of the document;
    reordering, by the computing device and based on the propensity scores, the portions of the document from most aligned with the title to least aligned with the title; and
    displaying, by the computing device, a user interface by which a user may interact with the reordered portions of the document.

2. The method of claim 1, further comprising generating, by the computing device and based on the concept of each of the portions of the document, a caption for each of the portions of the document.

3. The method of claim 1, wherein the portions of the document are paragraphs in the document.

4. The method of claim 1, wherein the portions of the document are photographs in the document.

5. The method of claim 1, wherein the document is an article.

6. The method of claim 1, further comprising grouping, by the computing device and based on the concept of each of the portions of the document, one or more of the portions of the document into a group.

7. The method of claim 6, wherein the grouping comprises applying unsupervised machine learning through clustering to determine which of the portions of the document to group together.

8. The method of claim 6, further comprising generating, by the computing device and based on the grouping, a caption for the group.

9. The method of claim 1, further comprising removing, by the computing device, the portions of the document that have the propensity score below a threshold.

10. The method of claim 1, further comprising categorizing, by the computing device, a word in one of the portions of the document as high risk, wherein high risk indicates an undesirable word.

11. The method of claim 1, further comprising determining, by the computing device, that the title is low risk, wherein low risk indicates a desirable title.

12. The method of claim 11, further comprising determining, by the computing device, that a word in one of the portions of the document as high risk, wherein high risk indicates an undesirable word.

13. The method of claim 1, further comprising:
deriving, by the computing device, attributes of the portions of the document;
assigning, by the computing device, weights to the attributes using deep learning; and
predicting, by the computing device, an intent of the document based on the weighted attributes.

14. A computer program product comprising one or more computer readable storage media having program instructions collectively stored on the one or more computer readable storage media, the program instructions executable to:
analyze a plurality of portions of a document;
determine, based on the analyzing, a concept of each of the portions of the document;
compare a title of the document with the concept of each of the portions of the document;
determine, based on the comparing, an alignment of the concept of each of the portions of the document with the title;
generate, based on the alignment, a propensity score for each of the portions of the document;
generate, based on the concept of each of the portions of the document, a caption for each of the portions of the document; and
display a user interface by which a user may interact with the generated portions of the document.

15. The computer program product of claim 14, further comprising program instructions executable to reorder, based on the propensity scores, the portions of the document from most aligned with the title to least aligned with the title.

16. The computer program product of claim 14, further comprising program instructions executable to receive, from a user, a risk level designation of a particular word in the portions of the document, wherein the risk level indicates desirability of the particular word.

17. The computer program product of claim 14, further comprising program instructions executable to:
derive attributes of the portions of the document;
assign weights to the attributes using deep learning; and
predict an intent of the document based on the weighted attributes.

18. The computer program product of claim 17, further comprising program instructions executable to compare the concept of one of the portions of the document to the intent of the document.

19. The computer program product of claim 18, further comprising program instructions executable to remove the one of the portions of the document based on the comparing the concept of the one of the portions of the document to the intent of the document.

20. A system comprising:
a processor, a computer readable memory, one or more computer readable storage media, and program instructions collectively stored on the one or more computer readable storage media, the program instructions executable to:
analyze a plurality of portions of a document;
determine, based on the analyzing, a concept of each of the portions of the document;
compare a title of the document with the concept of each of the portions of the document;
determine, based on the comparing, an alignment of the concept of each of the portions of the document with the title;
generate, based on the alignment, a propensity score for each of the portions of the document;
reorder, based on the propensity scores, the portions of the document from most aligned with the title to least aligned with the title; and
provide a user interface for a user to view the reordered portions of the document.

* * * * *